United States Patent [19]
Ito

[11] Patent Number: 5,218,476
[45] Date of Patent: Jun. 8, 1993

[54] ZOOM LENS SYSTEM

[75] Inventor: Takayuki Ito, Tokyo, Japan

[73] Assignee: Asahi Kogaku Kogyo K.K., Tokyo, Japan

[21] Appl. No.: 782,646

[22] Filed: Oct. 25, 1991

[30] Foreign Application Priority Data

Oct. 30, 1990 [JP] Japan .................. 2-292475

[51] Int. Cl.$^5$ ............................................. G02B 15/14
[52] U.S. Cl. .................... 359/676; 359/687; 359/689
[58] Field of Search .................... 359/672–676, 359/686–690

[56] References Cited

U.S. PATENT DOCUMENTS

| | | | |
|---|---|---|---|
| 4,494,828 | 1/1985 | Masumoto et al. | 359/685 |
| 4,701,033 | 10/1987 | Masumoto | 359/686 |
| 4,773,744 | 9/1988 | Yamanashi | 359/689 |
| 4,840,467 | 6/1989 | Takada et al. | 359/689 |
| 4,854,683 | 8/1989 | Yamanashi | 359/689 |
| 5,033,832 | 7/1991 | Ito | 359/676 |

FOREIGN PATENT DOCUMENTS

| | | |
|---|---|---|
| 60-57814 | 4/1985 | Japan . |
| 62-78522 | 4/1987 | Japan . |
| 63-43115 | 2/1988 | Japan . |
| 63-153511 | 6/1988 | Japan . |
| 63-157120 | 6/1988 | Japan . |
| 63-159818 | 7/1988 | Japan . |
| 63-161423 | 7/1988 | Japan . |
| 2224131A | 4/1990 | United Kingdom . |
| 2233113A | 1/1991 | United Kingdom . |

Primary Examiner—Bruce Y. Arnold
Assistant Examiner—Thong Nguyen
Attorney, Agent, or Firm—Sughrue, Mion, Zinn, Macpeak & Seas

[57] ABSTRACT

A zoom lens system for use with a compact camera includes, in order from the object side, a first lens unit having a positive focal length, a second lens unit having a positive focal length and including a positive plastic lens, and a third lens unit having a negative focal length. When zooming is carried out from a wide-angle end to a narrow-angle end, the first, second and third lens units are all moved towards the object in such a manner that a distance between the first and second lens units increases whereas a distance between the second and third lens units decreases. Proper positioning of the positive plastic lens and meeting certain conditions improves the characteristics of the lens system.

10 Claims, 10 Drawing Sheets

ZOOM LENS SYSTEM

This application is based on and claims from Japanese Application No. HEI 2-292475 filed Oct. 30, 1990, the disclosure of which is incorporated by reference herein.

BACKGROUND OF THE INVENTION

The present invention relates to a zoom lens system that has small constraint on back focus and that is suitable for use with compact cameras. More particularly, the present invention relates to a zoom lens system that has an exceptionally wide view angle (approximately 37° in terms of half view angle) in consideration of its use with compact cameras, that is small in size and that yet features a high zoom ratio of 2.5 and more.

Various types of zoom lens systems have heretofore been known for use with compact cameras. Zoom lenses consisting of three lens units or more with a zoom ratio exceeding 2 are categorized as follows:

(i) Four-unit zoom lens system comprising, in order from the object side, a positive lens unit I, a negative lens unit II, a stop diaphragm, a positive lens unit III, and a negative lens unit IV, all the lens units being moved independently of each other towards the object (this type includes a zoom lens where some of the four lens units are moved in unison). Examples of such lens systems are disclosed in Japanese Patent Laid-Open Publications No. SHO 63-43115, No. SHO 63-159818, and No. SHO 63-157120.

(ii) Three-unit lens system comprising a positive lens unit I, a negative lens unit II (which has a negative lens unit IIa disposed towards the object, a positive lens unit IIb disposed towards the image, and a stop diaphragm therebetween and which is equivalent to the lens unit II and the lens unit III of the above-described four-lens unit zoom system) and a negative lens unit II (which is equivalent to the lens unit IV of the four-lens unit zoom system), all the lens units being moved independently of each other towards the object. An example of this zoom lens system is disclosed in Japanese Patent Laid-Open Publication No. SHO 63-153511.

Examples of zoom lens systems that consist of three or more lens units and that have zoom ratios of less than 2 (approximately 1.5–1.6) are described in Japanese Patent Laid-Open Publications No. SHO 60-57814 (a four-unit type) and No. SHO 762-78522 (a three-unit type). The arrangement of the lens units and stop diaphragm in these systems are the same as in the systems (i) and (ii) described above.

(iii) Three-unit zoom lens systems comprising, in order from the object side, a positive lens unit I, a positive lens unit II (as in the system (ii), this positive lens unit II comprises, in order from the object side, a negative sub-unit IIa and a positive sub-unit IIb but no stop diaphragm is included), a stop diaphragm and a negative lens unit III, with all the lens units being moved toward the object. An example of this type of lens system is disclosed in commonly assigned Japanese Patent Application No. SHO 63-225294).

(iv) Effectively a four-unit zoom lens system that is the same as the system (iii) described above except that the sub-units IIa and IIb are moved independently of each other, e.g., as in Example 3 in the specification of commonly assigned Japanese Patent Application No. SHO 63-225294.

The above-described conventional zoom lens systems have their own problems. In the system (i), all of the four lens units have to be moved independently of each other, so many cams must be used in a restricted small space, causing difficulty in designing an effective mechanical composition for the lens barrel.

In the systems (i) and (ii), the stop diaphragm is disposed between the sub-units IIa and IIb (in the case of the four-unit type, the stop diaphragm is disposed between the lens units II and III); however, a shutter block must be disposed between the two lens units which are subject to substantial deterioration in performance due to any fabrication errors, so the overall lens arrangement will become complex, making it difficult to insure high mechanical precision. In addition, the high optical sensitivity of either system has made it difficult to achieve stabilization in optical performance. Furthermore, the compactness of those lens systems is still insufficient for use with compact cameras.

With a view to solving the aforementioned problems, the present inventors previously proposed the systems (iii) and (iv) described in Japanese Patent Application No. SHO 63-225294. However, those systems as well as systems (i) and (ii) feature a half view angle of only about 30° at the wide-angle end, and their main object is to provide an improved telephoto effect by increasing the focal length at the narrow-angle end. However, many users require a wide enough angle to permit taking scenic pictures. To those users, the half view angle of about 30° at the wide-angle end is insufficient, but conventional zoom lens systems have not fully met the requirement for wide angles and high zoom ratios.

In short, conventional zoom lens systems for use with compact cameras are basically of a telephoto type over the entire zooming range, and it has generally been held that the requirement for achieving a wider angle and higher zoom ratio at the same time is very difficult to meet in such zoom lens systems for use with compact cameras that are basically of a telephoto type.

A further problem with a high zoom ratio zoom lens system for use with compact cameras is that the more compact they are, the more abrupt the increase in the amount of defocusing (or focus movement) that occurs in response to the change in the distance between lens units. The focusing position is sensitive to temperature, so that at elevated temperatures even a slight increase in the distance between lens units will cause a substantial change in the focusing position in the negative direction (towards the lens). This problem has been particularly noticeable in the case where one of the lenses used is a plastic lens which is highly susceptible to temperature changes.

SUMMARY OF THE INVENTION

An object of the present invention is to address the problems described above, and further to provide a zoom lens system that is capable of effective compensation for the curvature of field and distortion and which yet satisfies the requirement for a wider angle and a higher zoom ratio at the same time.

Another object of the present invention is to provide a zoom lens system that permits the use of a smaller-diameter front lens.

Still another object of the present invention is to provide a zoom lens system that intentionally uses a plastic lens which is highly susceptible to temperature changes so as to compensate for focus movement that should occur due to other factors, such as manufacturing and size considerations.

These and other objects are achieved according to the present invention by a zoom lens system for use with a compact camera, comprising, in order from the object side, a first lens unit having a positive focal length, a second lens unit having a positive focal length and a third lens unit having a negative focal length. When zooming is carried out from the wide-angle to the narrow-angle end, the first, second and third lens units are all moved towards the object in such a manner that the distance between the first and second lens units increases whereas the distance between the second and third lens units decreases. This lens system is characterized in that it satisfies the following conditions 1 and 2:

Condition 1

The second lens unit comprises, in order from the object side, a sub-unit 2a having a negative focal length, a sub-unit 2b having a positive focal length, and a lens 2m having a positive focal length that is provided between sub-units 2a and 2b and that has a convex surface directed towards the image plane.

Condition 2

The lens 2m satisfies the following conditions:

$$0.0 < \frac{f_s}{f_{2m}} < 0.3 \tag{A}$$

$$-3.0 < \frac{r_{2m}}{f_s} < -0.8 \tag{B}$$

where $f_s$ is the focal length of the overall zoom lens system at the wide-angle end, $f_{2m}$ is the focal length of lens 2m, and $r_{2m}$ is the radius of curvature of lens 2m on its image plane side.

If the lens 2m of small power which has a positive focal length and a convex surface directed towards the image plane is disposed between the negative sub-unit 2a and the positive sub-unit 2b, the curvature of field and distortion that occur as a result of designing a system of wider angles can be compensated easily and, at the same time, the diameter of the front lens can be reduced.

BRIEF DESCRIPTION OF THE DRAWINGS

The invention will be more clearly understood from the following description in conjunction with the accompanying drawings, in which:

In FIGS. 1, 3, 5, 7 and 9, $r_i$ denotes the radius of curvature of an individual lens surface, $d_i$ the lens thickness or the aerial distance between adjacent lenses, and A the stop diaphragm.

DETAILED DESCRIPTION OF THE PREFERRED EMBODIMENT

The arrangement of the lens system of the present invention has been generally described above, including the conditions which must be satisfied. The following is a more detailed explanation of the significance of various design details.

Condition (A) specifies the power of the lens 2m. If the upper limit of this condition is exceeded, the positive power of the lens 2m becomes so large that it becomes difficult not only to achieve effective compensation for the curvature of field but also to increase the back focus. If the lower limit of condition (A) is not reached, the lens 2m will not have a positive power and effective compensation for distortion cannot be achieved.

Condition (B) specifies the radius of curvature of the convex surface of the lens 2m. If the upper limit of this condition is exceeded, the radius of curvature of the convex surface becomes so small that a higher-order distortion will occur at the wide-angle end and the distortion will make an abrupt change in the positive direction at wider view angles. If the lower limit of condition (B) is not reached, the effectiveness of the lens 2m is lost, making it difficult to achieve effective compensation for the curvature of field.

The shape effect of the lens 2m is great enough to obviate the need for providing it with a great power. Hence, for practical purposes it is feasible to make the lens of plastic materials, and plastic lenses can easily be provided with aspheric surfaces.

If the lens 2m is to be made of a plastic material and to have an aspheric surface, the amount of its asphericity is advantageously made divergent with respect to the paraxial curvature radius (i.e., in a direction in which the radius of curvature decreases as the diameter of the aspheric surface increases, assuming that it is concave) for the purpose of achieving effective compensation for distortion. In a particularly advantageous embodiment, the lens 2m has an aspheric surface that is divergent with respect to the paraxial radius of curvature in such as way as to satisfy the following condition (C):

$$-15 < \Delta I_{2m} < 0 \tag{C}$$

where $\Delta I_{2m}$ is the amount of variation in the coefficient of the third-order spherical aberration due to the aspheric surface of the positive plastic lens in the second lens unit (the aberration coefficient is such as is obtained when the focal length of the overall system at the wide-angle end is regarded as unity).

If the upper limit of condition (C) is exceeded, the aspheric surface is no longer divergent. If the lower limit of condition (C) is not reached, the result is advantageous for effective compensation for distortion but, on the other hand, the amount of asphericity will increase to cause overcompensation of astigmatism.

If another aspheric lens is provided in the sub-unit 2b, it becomes easy to compensate for spherical aberration and coma. In order to reduce the divergence of the negative sub-unit 2a, the added aspheric lens preferably has a divergent aspheric surface. The amount of its asphericity is desirably such that it is divergent with respect to the paraxial radius of curvature and that it satisfies the following condition:

$$-30 < \Delta I_{2b} < -3 \tag{D}$$

where $\Delta I_{2b}$ is the amount of variation in the coefficient of the third-order spherical aberration due to the aspheric surface in sub-unit 2b.

If the upper limit of condition (D) is exceeded, the amount of asphericity of the aspheric surface is too small to justify its provision. If the lower limit of condition (D) is not reached, the amount of asphericity becomes excessively large to increase the likelihood of higher-order spherical aberrations and coma. At the same time, any fabrication errors can potentially cause substantial deterioration in performance.

The first lens unit having a positive focal length comprises, in order from the object side, a biconcave negative lens, a biconvex positive lens and a positive lens having a convex surface directed towards the object.

The sub-unit 2a having a negative focal length comprises a cemented negative lens consisting of, in order from the object side, a biconcave negative lens element and a positive lens element, with the cemented interface being convex towards the object.

The sub-unit 2b having a positive focal length comprises, in order from the object side, a cemented positive lens and a positive lens, said cemented positive lens consisting of, in order from the object side, a positive lens element and a negative meniscus lens element, with the cemented interface being concave towards the object.

The third lens unit having a negative focal length comprises, in order from the object side, a positive lens having a convex surface directed towards the image plane and two negative lenses each having a concave surface directed towards the object.

It is also desired that the first lens unit satisfies the following conditions (E) and (F). If these conditions are satisfied, the purpose of providing a wider angle and a higher zoom ratio can be attained more easily:

$$1.07 < \frac{h_{IMAX}}{h_{I-1}} < 1.4 \quad \text{(E)}$$

$$0.5 < \frac{f_T}{f_I} < 1.5 \quad \text{(F)}$$

where $h_{IMAX}$ is the maximum value of the height of paraxial rays in the first lens unit, $h_{I-1}$ is the height of paraxial on-axis rays on the first surface of the first lens unit, $f_T$ is the focal length of the overall system at the narrow-angle end, and $f_I$ is the focal length of the first lens unit.

In a compact lens system like the zoom lens of the present invention, the focusing sensitivity of each lens unit (the change in its focusing position in response to a fabrication error) is high. If, at higher temperatures, the distance between lens units increases, the focusing position will make a shift in the negative direction (towards the lens) no matter how small the increase is. In order to compensate for this shift, the zoom lens system of the present invention uses a plastic lens, e.g., for the small power positive lens in the second lens unit, and this offers the advantage that even at elevated temperatures, any adverse effects that temperature changes can cause on the lens barrel and other lenses which are not made of plastic materials can be effectively canceled.

In a specific embodiment, any adverse effects of temperature changes on the focusing position can be canceled by incorporating a plastic lens that has a positive focal length and that satisfies the following condition (G):

$$0.0 < \frac{f_L}{f_p} < 0.5 \quad \text{(G)}$$

where $f_L$ is the focal length of the overall system at the narrow-angle end, and $f_p$ is the focal length of the plastic lens.

If the upper limit of condition (G) is exceeded, the positive power of the plastic lens becomes excessive to cause overcompensation. If the lower limit of condition (G) is not reached, the plastic lens will have a negative power and is incapable of canceling the adverse effects that temperature changes can cause on the focusing position.

In the zoom lens system of the present invention, a stop diaphragm may be disposed either within the second lens unit or between the second and third lens units, in such a manner that it is movable in unison with the second lens unit during zooming. This arrangement is advantageous for reducing the diameter of the front lens.

Focusing from infinity to a short distance may be carried out by either one of the following methods:

(i) The first lens unit, the stop diaphragm and the third lens unit are fixed and only the second lens unit is moved towards the object; or (ii) the first lens unit, the second lens unit and the stop diaphragm are fixed and only the third lens unit is moved towards the image plane.

Either method permits the focusing drive mechanism to be of simple construction.

If the mechanism permits, focusing can also be performed by the following method:

(iii) the stop diaphragm disposed either within the second lens unit or between the second and third lens units is moved in unison with the second lens unit.

This approach has the advantage of serving to increase the marginal illumination and reduce the diameter of the front lens.

If the mechanism also permits, the sub-units 2a and 2b may be moved towards the object independently of each other during zooming and, as one skilled in the art can readily anticipate, this arrangement will increase the degree of freedom in lens movement and reduce the possible variations in astigmatism due to zooming. Hence, this modification in which the sub-units 2a and 2b are moved independently of each other during zooming is still within the scope of the present invention.

The amount of variation in the coefficient of the third order aberration due to the aspheric surface will now be described. The shape of the aspheric surface can be generally expressed as follows.

$$x = \frac{cy^2}{1 + \sqrt{1 - c^2 y^2}} + a_4 y^4 + a_6 y^6 + a_8 y^8 + a_{10} y^{10} + \ldots$$

When the focal length f is 1.0, the resultant value is transformed as follows. Namely, substitute the following equations into the above equation:

$$X = \frac{x}{f}, \quad Y = \frac{y}{f}, \quad C = fc$$

$$A_4 = f^3 a_4, \quad A_6 = f^5 a_6, \quad A_8 = f^7 a_8, \quad A_{10} = f^9 a_{10}$$

In this way, the following equation is obtained.

$$x = \frac{CY^2}{1 + \sqrt{1 - C^2Y^2}} + A_4Y^4 + A_6Y^6 + A_8Y^8 + A_{10}Y^{10} + \ldots$$

The second and subsequent terms define the amount of asphericity of the aspheric surface.

The relationship between the coefficient $A_4$ of the second term and the coefficient of the third-order aspheric surface $\Phi$ is expressed by:

$$\Phi = 8(N'-N)A_4$$

where N is the refractive index where the aspheric surface is not provided, and N' is the refractive index where the aspheric surface is provided.

The coefficient of the aspheric surface $\Phi$ provides the following amounts of variation in the coefficients of the various kinds of third-order aberration.

$\Delta I = h^4 \Phi$
$\Delta II = h^3 \bar{h} \Phi$
$\Delta III = h^2 \bar{h}^2 \Phi$
$\Delta IV = h^2 \bar{h}^2 \Phi$
$\Delta V = h \bar{h}^3 \Phi$ where I is the aspherical aberration coefficient, II is the coma coefficient, III is the astigmatism coefficient, IV is the curved surface coefficient of spherical image absent surface, V is a distortion coefficient, h is the height of paraxial on-axis rays passing through each lens surface, and $\bar{h}$ is the height of paraxial and off-axis rays passing through the center of the pupil and each lens surface.

The shape of aspheric surface can be expressed by various other equations but when y is smaller than the paraxial radius of curvature, satisfactory approximation can be achieved by even-order terms alone. Hence, it should be understood that the applicability of the present invention is in no way compromised by merely changing the equations for expressing the shape of the aspheric surface.

EXAMPLES

Examples 1–5 of the present invention are described below with reference to data sheets, in which $F_{NO}$ denotes an F number, f the focal length, $\omega$ the half view angle, $f_B$ the back focus, r the radius of curvature of an individual lens surface, d the lens thickness or the aerial distance between adjacent lenses, N the refractive index at the d-line, and $\nu$ the Abbe number.

FIGS. 1, 3, 5, 7 and 9 are simplified cross-sectional views of the zoom lens systems at the wide-angle end according to Examples 1, 2, 3, 4 and 5, respectively, of the present invention; and FIGS. 2, 4, 6, 8 and 10 are graphs plotting the aberration curves obtained at the wide-angle end (a), middle-angle end (b) and narrow-angle end (c) with the zoom lens systems according to Examples 1, 2, 3, 4 and 5, respectively.

Figure 1:
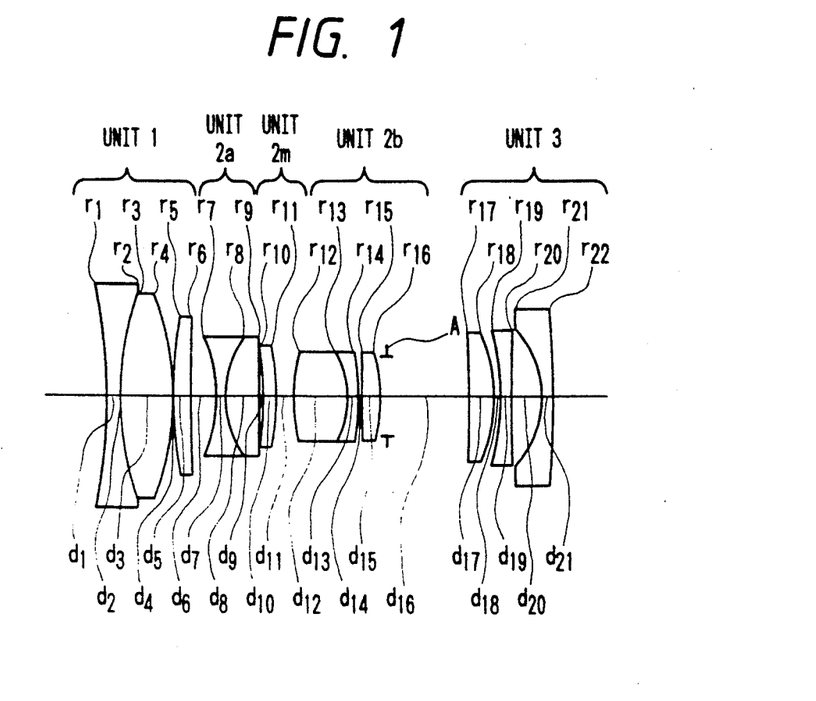
FIGS. 1, 3, 5, 7 and 9 are simplified cross-sectional views of the zoom lens systems at the wide-angle end according to Examples 1, 2, 3, 4 and 5, respectively, of the present invention.
Figure 2A:
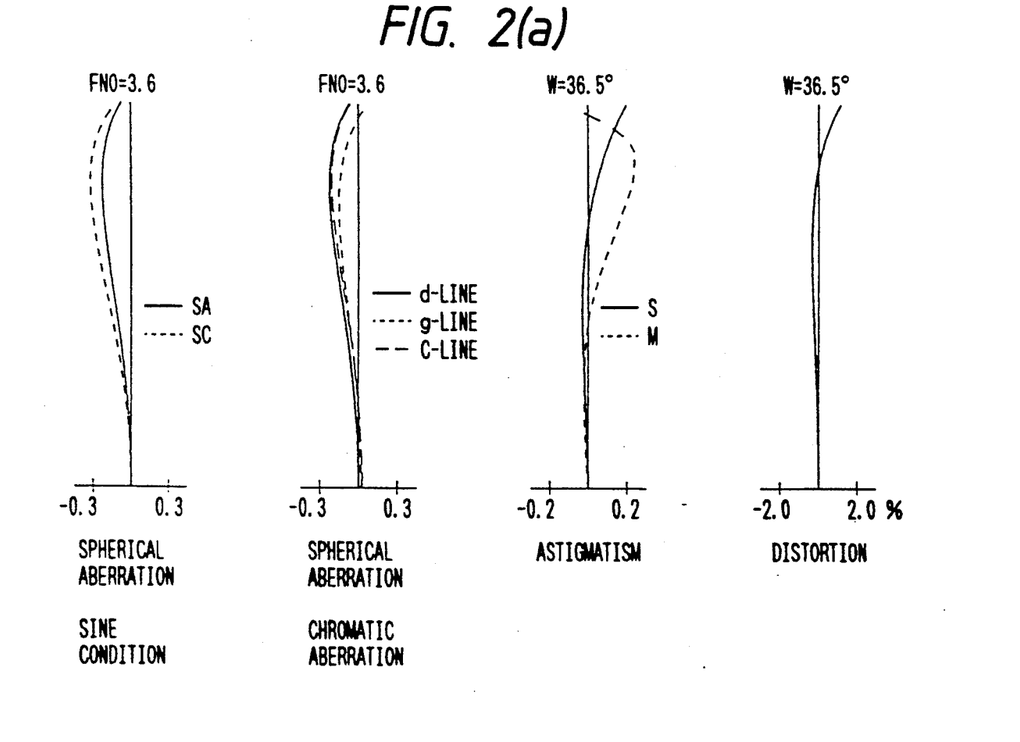
FIGS. 2, 4, 6, 8 and 10 are graphs plotting the aberration curves obtained at the wide-angle end (a), middle-angle end (b) and narrow-angle end (c) with the zoom lens systems according to Examples 1, 2, 3, 4 and 5, respectively.
Figure 2B:
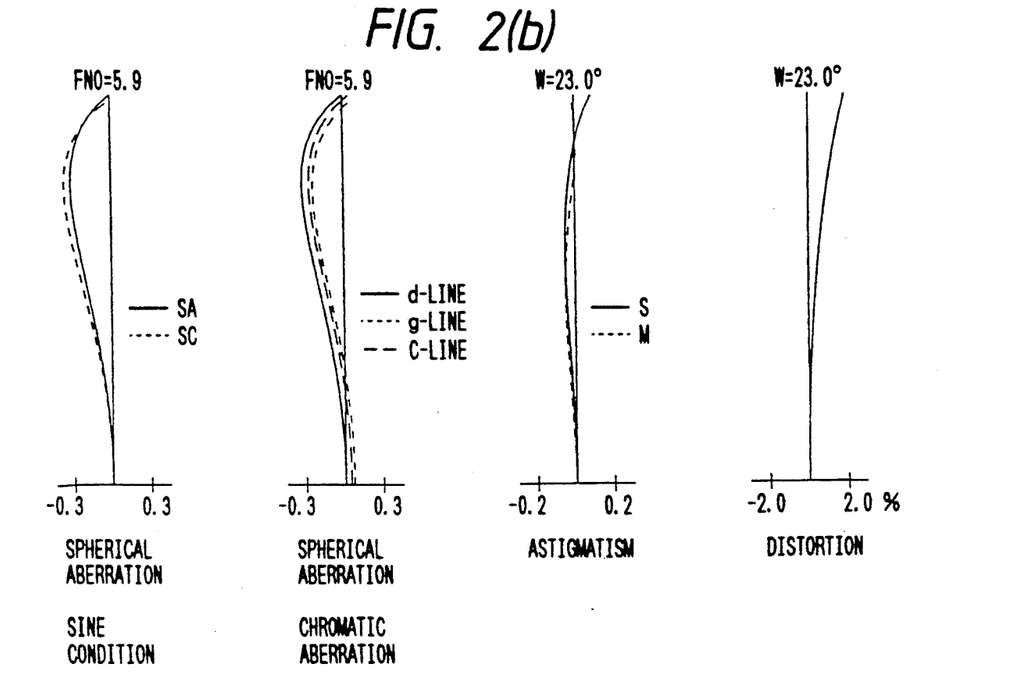
Figure 2C:
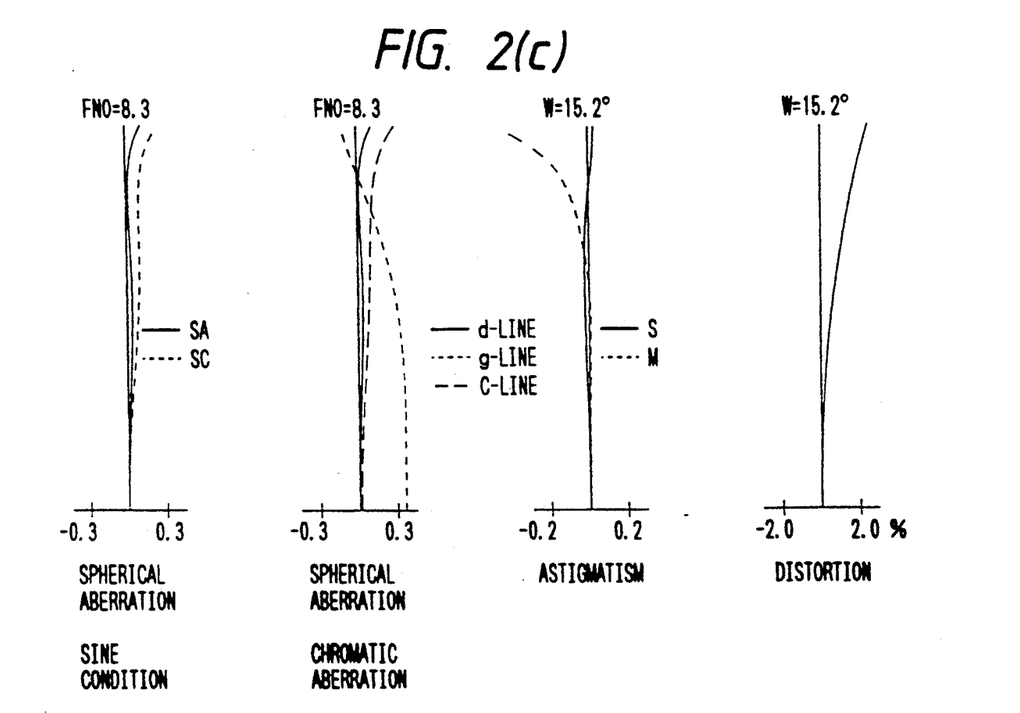
Figure 3:
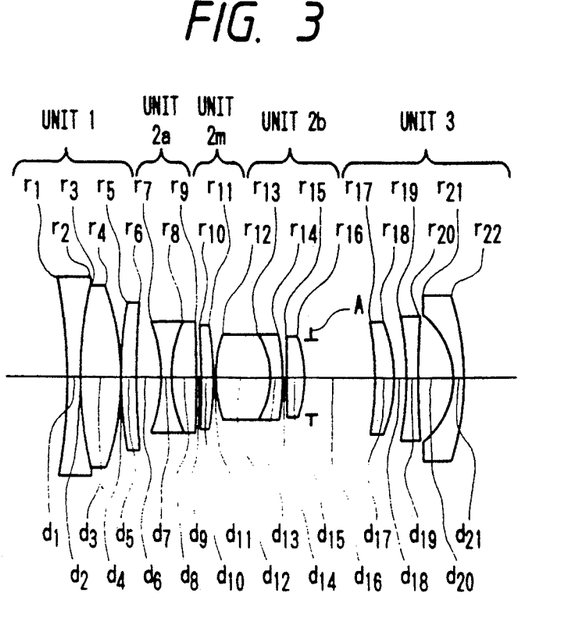
Figure 4A:
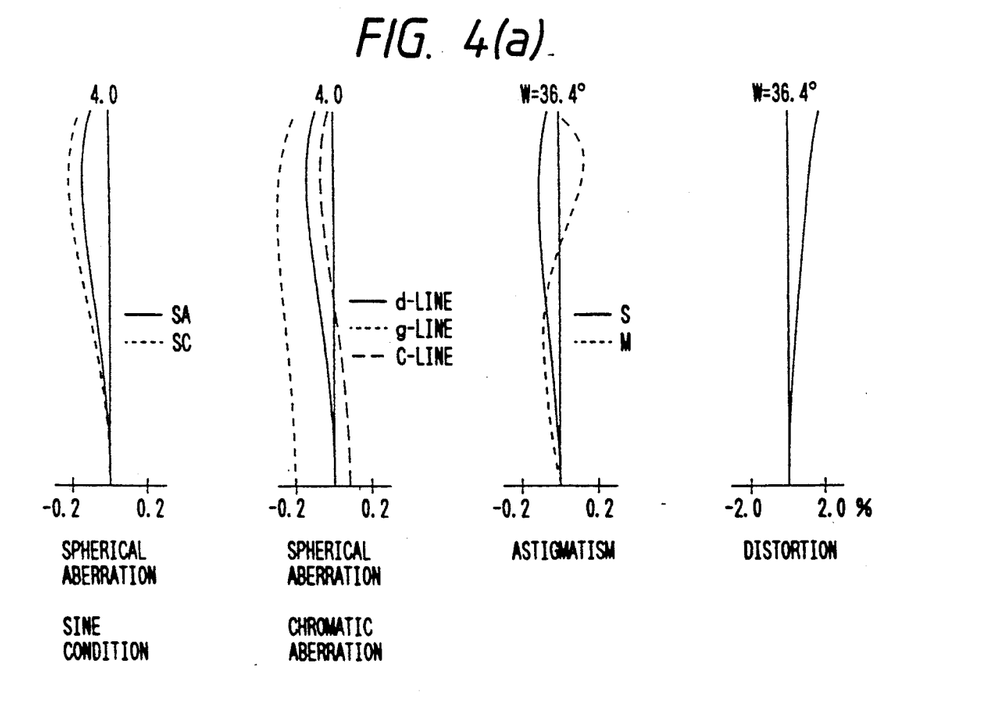
Figure 4B:
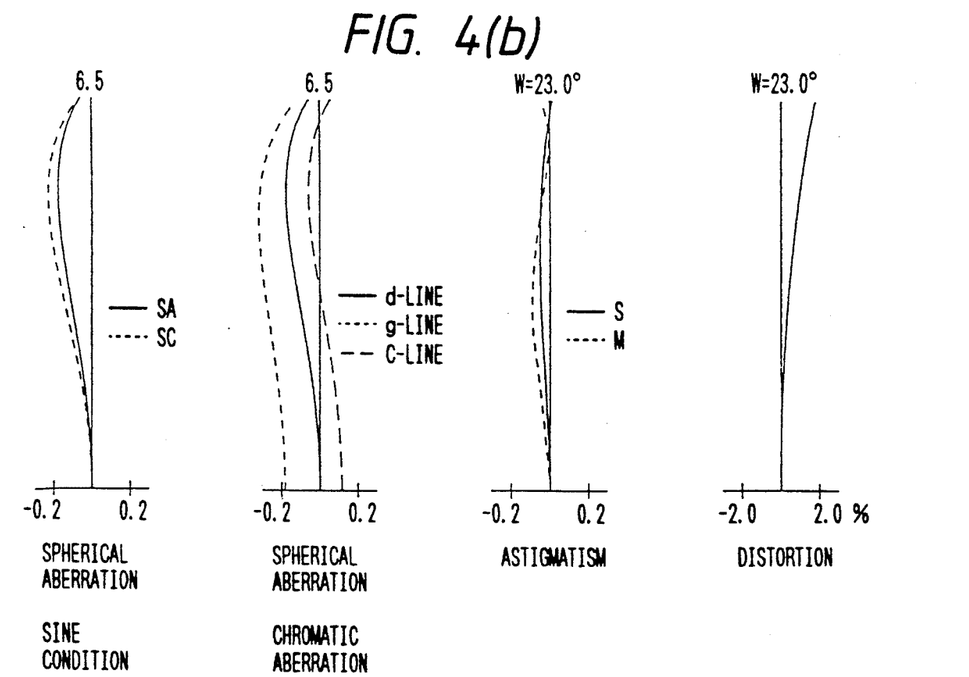
Figure 4C:
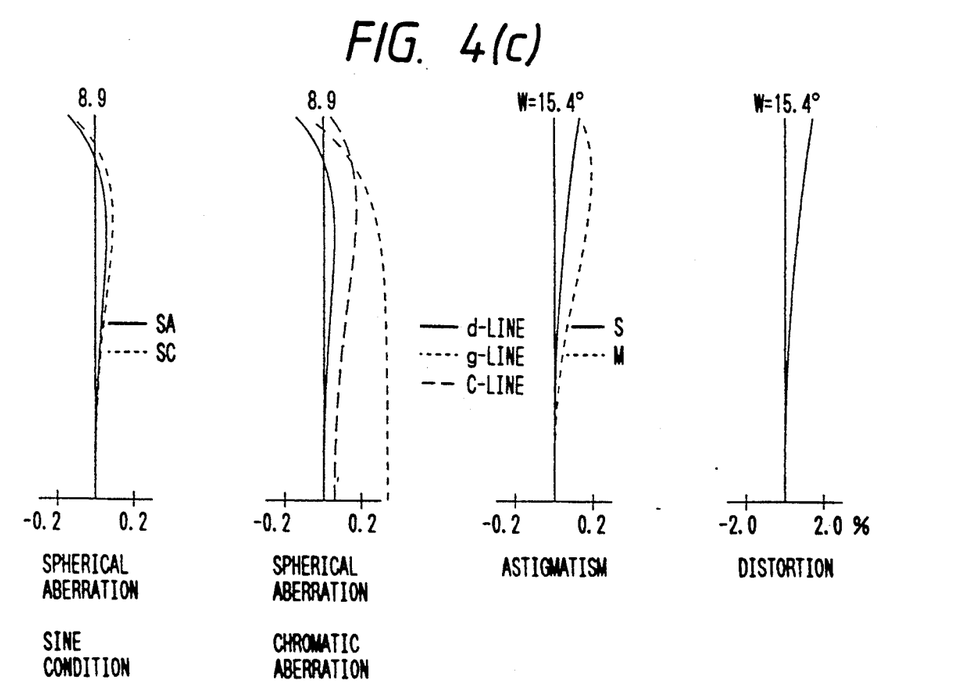
Figure 5:
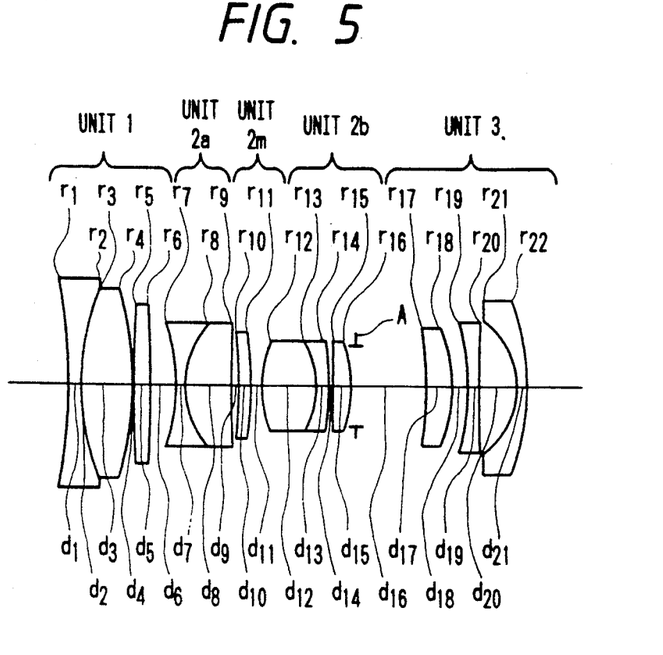
Figure 6A:
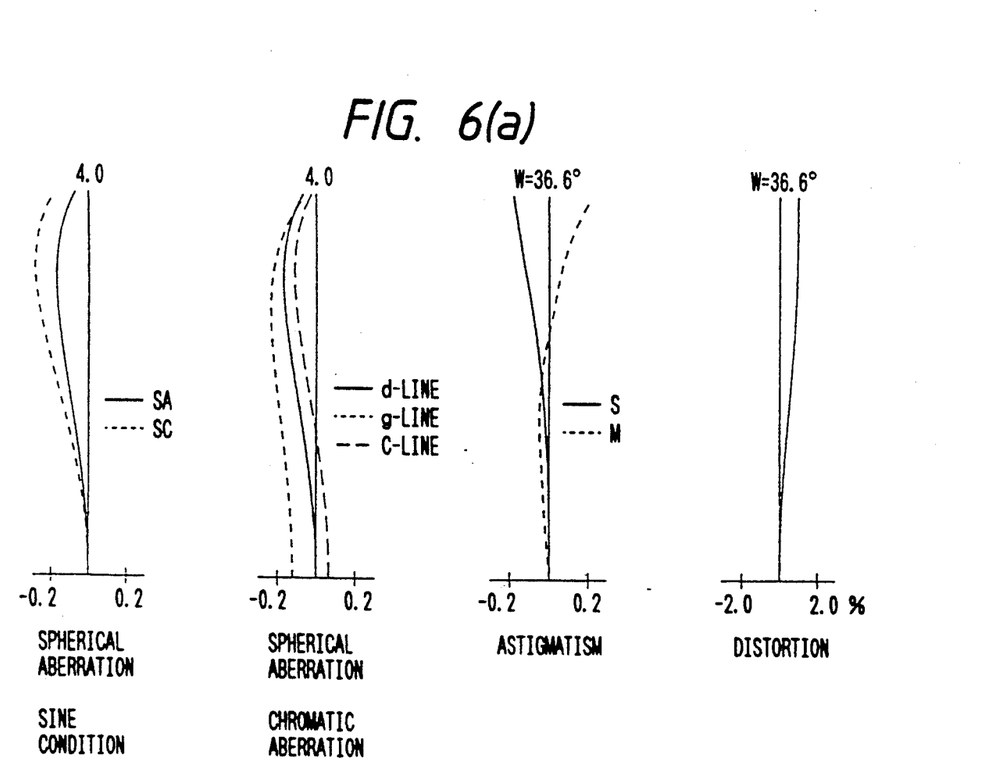
Figure 6B:
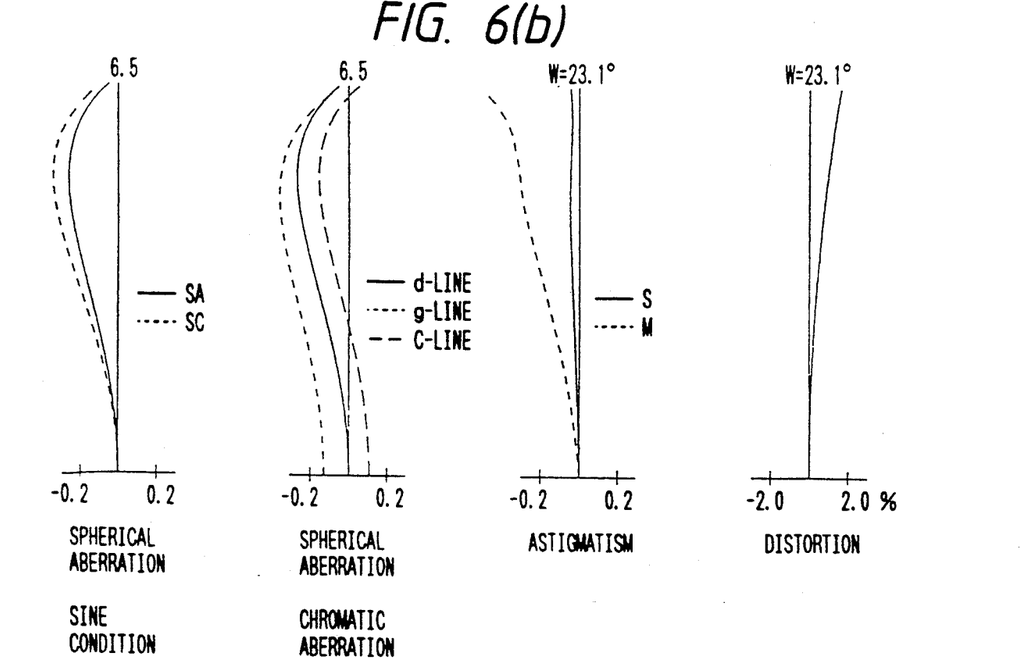
Figure 6C:
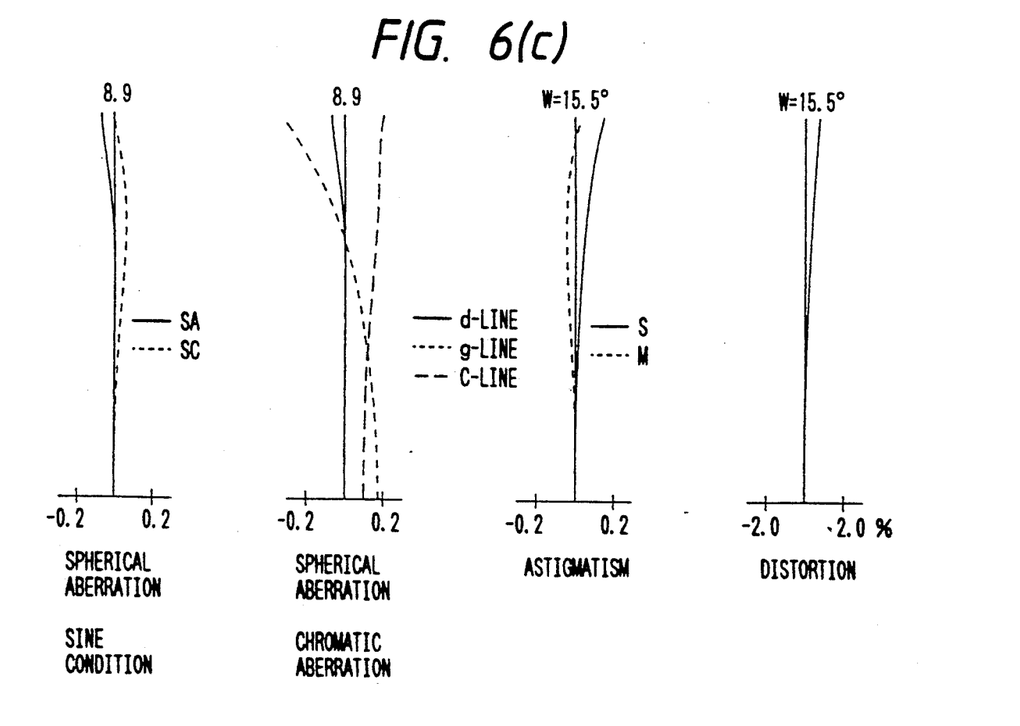
Figure 7:
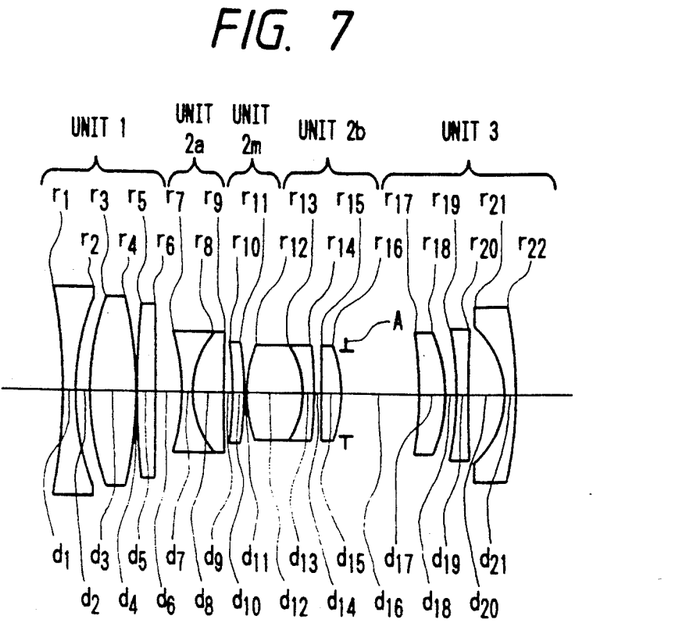
Figure 8A:
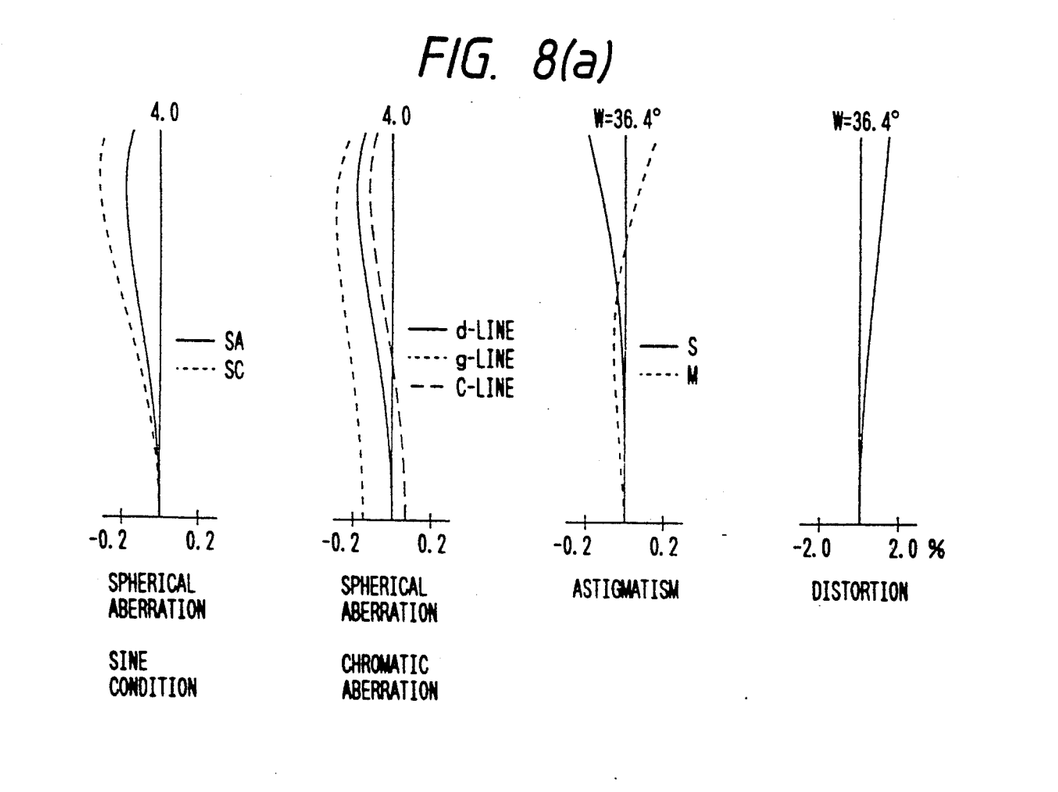
Figure 8B:
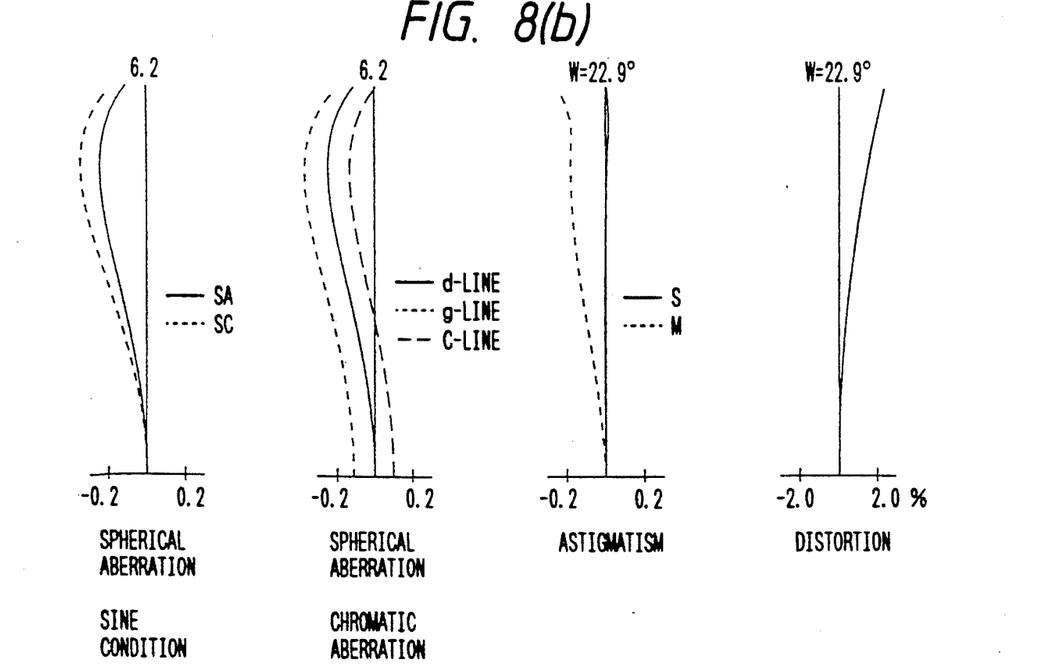
Figure 8C:
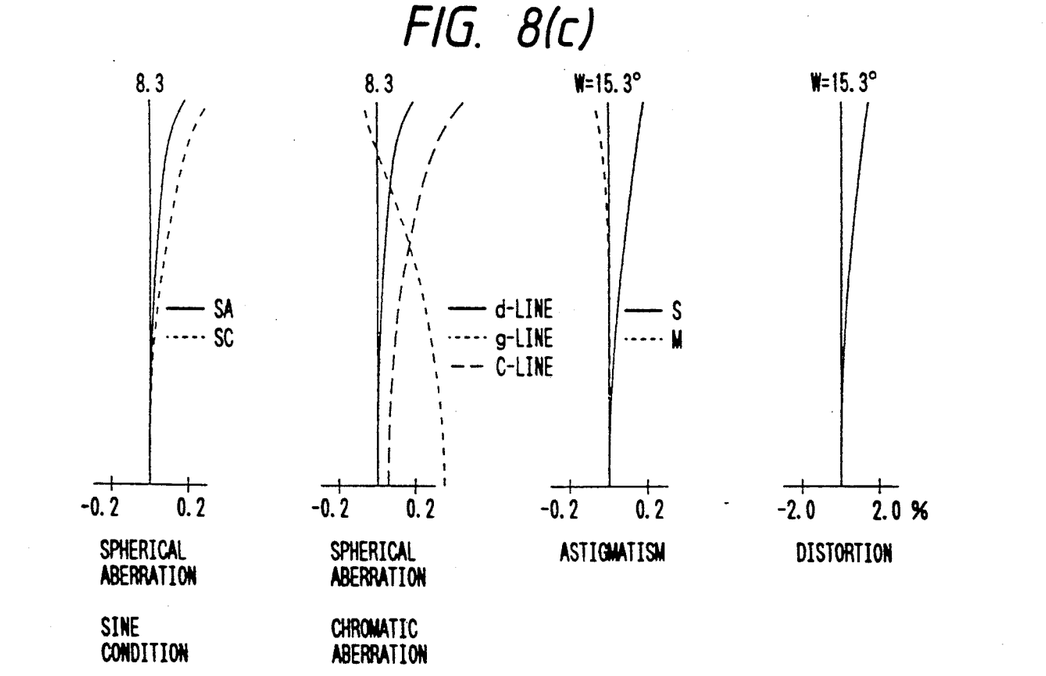
Figure 9:
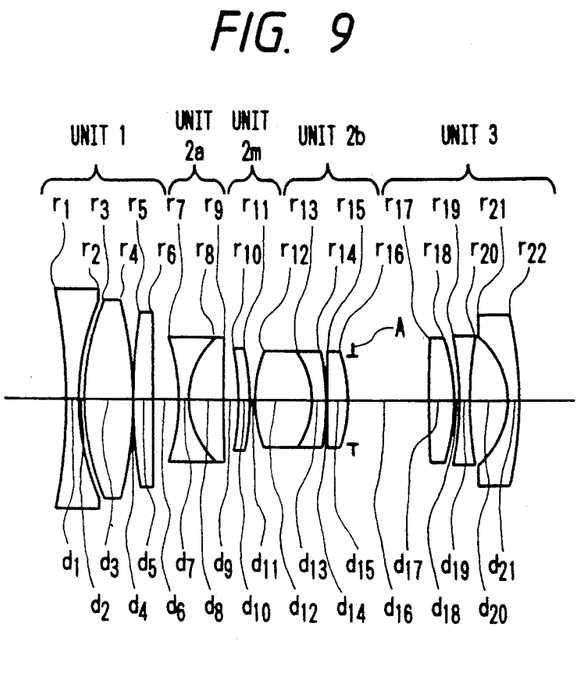
Figure 10A:
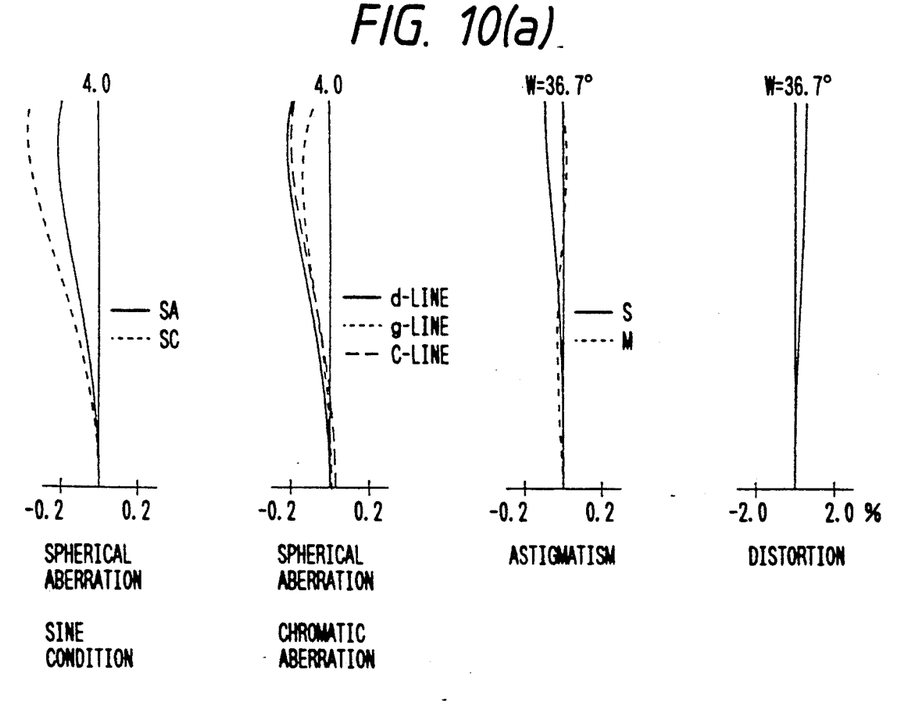
Figure 10B:
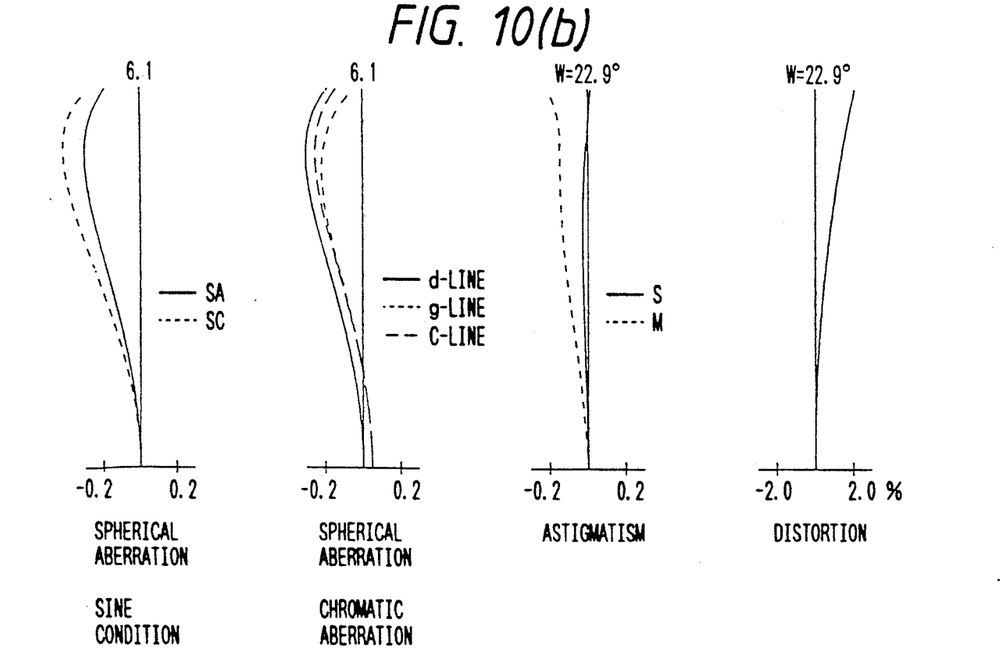
Figure 10C:
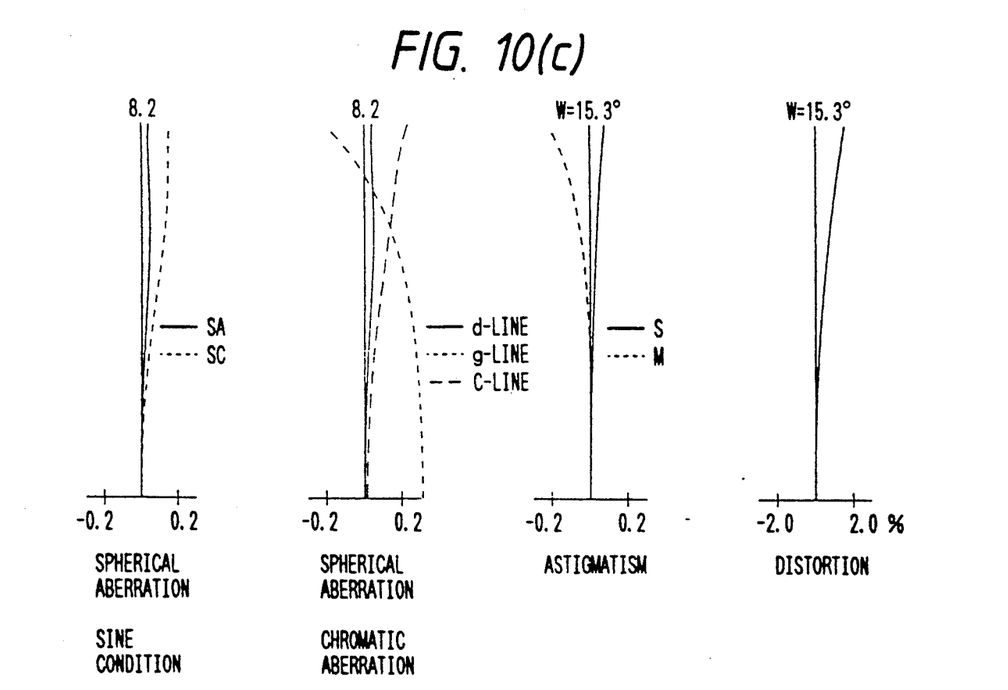

In Example 3, the first and third lens units are movable in unison.

In FIGS. 1, 3, 5, 7 and 9, $r_i$ denotes the radius of curvature of an individual lens surface, $d^i$ the lens thickness or the aerial distance between adjacent lenses, and A the stop diaphragm which is movable in unison with the second lens unit during zooming.

EXAMPLE 1

| EXAMPLE 1 | | | | |
|---|---|---|---|---|
| $F_{NO}$ = 1:3.6 ~ 5.9 ~ 8.3 | | | $\omega$ = 36.5° ~ 23.0° ~ 15.2° | |
| f = 28.92 ~ 50.00 ~ 77.93 | | | $f_B$ = 8.51 ~ 27.08 ~ 48.23 | |
| No. | r | d | N | $\nu$ |
| 1 | −67.000 | 1.50 | 1.83400 | 37.2 |
| 2 | 33.539 | 0.19 | | |
| 3 | 36.020 | 6.24 | 1.69680 | 55.5 |
| 4 | −36.020 | 0.10 | | |
| 5 | 55.774 | 2.16 | 1.69680 | 55.5 |
| 6 | 224.435 | 3.00 ~ 6.08 ~ 11.46 | | |
| 7 | −19.015 | 1.20 | 1.83481 | 42.7 |
| 8 | 11.851 | 4.07 | 1.80518 | 25.4 |
| 9 | −378.015 | 0.61 | | |
| 10 | −35.419 | 1.50 | 1.53172 | 48.9 |
| 11 | −29.073 | 1.94 | plastic | |
| 12 | 19.004 | 6.70 | 1.48749 | 70.2 |
| 13 | −11.083 | 1.50 | 1.80518 | 25.4 |
| 14 | −27.707 | 0.26 | | |
| 15 | 167.763 | 2.40 | 1.58913 | 61.2 |
| 16 | *−18.090 | 10.72 ~ 5.20 ~ 2.27 | | |
| 17 | −131.592 | 3.00 | 1.80518 | 25.4 |
| 18 | −19.663 | 0.85 | | |
| 19 | −26.777 | 1.30 | 1.83400 | 37.2 |
| 20 | 1103.452 | 3.63 | | |
| 21 | −11.955 | 1.40 | 1.77250 | 49.6 |
| 22 | −125.637 | — | | |

*Aspheric surface:
C = 0, $A_4$ = 0.46086379 × $10^{-4}$, $A_6$ = 0.82005465 × $10^{-8}$, $A_8$ = 0.10186670 × $10^{-8}$, $A_{10}$ = 0, $A_{12}$ = 0

EXAMPLE 2

| EXAMPLE 2 | | | | |
|---|---|---|---|---|
| $F_{NO}$ = 1:4.0 ~ 6.5 ~ 8.9 | | | $\omega$ = 36.4° ~ 23.0° ~ 15.4° | |
| f = 28.90 ~ 50.04 ~ 77.37 | | | $f_B$ = 8.13 ~ 26.42 ~ 48.75 | |
| No. | r | d | N | $\nu$ |
| 1 | −67.000 | 1.50 | 1.83400 | 37.2 |
| 2 | 44.499 | 0.28 | | |
| 3 | 53.147 | 4.86 | 1.69680 | 55.5 |
| 4 | −35.949 | 0.10 | | |
| 5 | 56.496 | 1.79 | 1.69680 | 55.5 |
| 6 | 102.554 | 3.10 ~ 6.40 ~ 10.27 | | |
| 7 | −18.376 | 1.20 | 1.83481 | 42.7 |
| 8 | 15.850 | 3.18 | 1.80518 | 25.4 |
| 9 | −146.081 | 0.59 | | |
| 10 | *−88.965 | 1.40 | 1.49176 | 57.4 |
| 11 | −47.903 | 0.48 | plastic | |
| 12 | 17.796 | 6.70 | 1.48749 | 70.2 |
| 13 | −10.202 | 1.50 | 1.80518 | 25.4 |
| 14 | −26.102 | 0.49 | | |
| 15 | −1836.662 | 2.20 | 1.73077 | 40.5 |
| 16 | *−17.510 | 8.77 ~ 4.29 ~ 2.05 | | |
| 17 | −39.250 | 2.37 | 1.80518 | 25.4 |
| 18 | −18.754 | 1.53 | | |
| 19 | −34.599 | 1.30 | 1.83400 | 37.2 |
| 20 | 105.749 | 4.20 | | |
| 21 | −10.382 | 1.40 | 1.77250 | 49.6 |
| 22 | −33.090 | — | | |

*Aspheric surface:
No. 10; C = 0, $A_4$ = −0.30610322 × $10^{-4}$, $A_6$ = 17308280 × $10^{-7}$, $A_8$ = 0.17819470 × $10^{-8}$, $A_{10}$ = 0, $A_{12}$ = 0
No. 16; C = 0, $A_4$ = 0.40322927 × $10^{-4}$, $A_6$ = 0.14584050 × $10^{-6}$, $A_8$ = 0.76957961 × $10^{-9}$, $A_{10}$ = 0, $A_{12}$ = 0

EXAMPLE 3

| EXAMPLE 3 | | | | |
|---|---|---|---|---|
| $F_{NO}$ = 1:4.0 ~ 6.5 ~ 8.9 | | | $\omega$ = 36.6° ~ 23.1° ~ 15.5° | |
| f = 28.90 ~ 50.00 ~ 77.50 | | | $f_B$ = 8.11 ~ 26.36 ~ 50.07 | |
| No. | r | d | N | $\nu$ |
| 1 | −67.000 | 1.50 | 1.83400 | 37.2 |
| 2 | 30.000 | 0.26 | | |
| 3 | 32.773 | 6.11 | 1.69680 | 55.5 |

-continued

EXAMPLE 3

$F_{NO} = 1{:}4.0 \sim 6.5 \sim 8.9$   $\omega = 36.6° \sim 23.1° \sim 15.5°$
$f = 28.90 \sim 50.00 \sim 77.50$   $f_B = 8.11 \sim 26.36 \sim 50.07$

| No. | r | d | N | v |
|---|---|---|---|---|
| 4 | −39.175 | 0.10 | | |
| 5 | 185.825 | 1.91 | 1.69680 | 55.5 |
| 6 | −214.933 | 3.10 ∼ 7.72 ∼ 10.08 | | |
| 7 | −24.815 | 1.20 | 1.83481 | 42.7 |
| 8 | 10.800 | 5.51 | 1.80518 | 25.4 |
| 9 | 171.253 | 0.87 | | |
| 10 | *−88.087 | 1.40 | 1.49176 | 57.4 |
| 11 | −55.625 | 1.32 | plastic | |
| 12 | 15.256 | 6.70 | 1.48749 | 70.2 |
| 13 | −10.305 | 1.50 | 1.80518 | 25.4 |
| 14 | −32.883 | 0.42 | | |
| 15 | 2240.567 | 2.20 | 1.73077 | 40.5 |
| 16 | *−17.925 | 9.05 ∼ 4.43 ∼ 2.06 | | |
| 17 | −47.132 | 3.10 | 1.80518 | 25.4 |
| 18 | −19.003 | 1.97 | | |
| 19 | −25.034 | 1.30 | 1.80610 | 40.9 |
| 20 | 192.956 | 4.51 | | |
| 21 | −10.000 | 1.40 | 1.77250 | 49.6 |
| 22 | −27.468 | — | | |

*Aspheric surface:
No. 10; $C = 0$, $A4 = -0.30610322 \times 10^{-4}$, $A6 = 0.17308280 \times 10^{-7}$, $A8 = 0.17819470 \times 10^{-8}$, $A10 = 0$, $A12 = 0$
No. 16; $C = 0$, $A4 = 0.40322927 \times 10^{-4}$, $A6 = 0.14584050 \times 10^{-6}$, $A8 = 0.76957961 \times 10^{31\,9}$, $A10 = 0$, $A12 = 0$

EXAMPLE 4

$F_{NO} = 1{:}4.0 \sim 6.2 \sim 8.3$   $\omega = 36.4° \sim 22.9° \sim 15.3°$
$f = 28.90 \sim 50.09 \sim 77.79$   $f_B\,8.25 \sim 25.44 \sim 47.38$

| No. | r | d | N | v |
|---|---|---|---|---|
| 1 | −67.000 | 1.50 | 1.83400 | 37.2 |
| 2 | 38.841 | 1.57 | | |
| 3 | 33.282 | 5.70 | 1.69680 | 55.5 |
| 4 | −47.946 | 0.10 | | |
| 5 | 103.144 | 2.24 | 1.69680 | 55.5 |
| 6 | −373.767 | 3.10 ∼ 8.44 ∼ 11.86 | | |
| 7 | −24.342 | 1.20 | 1.83481 | 42.7 |
| 8 | 10.901 | 3.81 | 1.80518 | 25.4 |
| 9 | 186.186 | 1.14 | | |
| 10 | *−40.665 | 1.40 | 1.49176 | 57.4 |
| 11 | −30.995 | 0.35 | plastic | |
| 12 | 16.021 | 6.70 | 1.48749 | 70.2 |
| 13 | −10.437 | 1.48 | 1.80518 | 25.4 |
| 14 | −40.945 | 0.72 | | |
| 15 | 233.920 | 2.40 | 1.73077 | 4.05 |
| 16 | *−16.992 | 9.24 ∼ 4.67 ∼ 2.28 | | |
| 17 | −56.187 | 3.10 | 1.80518 | 25.4 |
| 18 | −20.665 | 1.46 | | |
| 19 | −35.093 | 1.30 | 1.83400 | 37.2 |
| 20 | 140.537 | 4.35 | | |
| 21 | −10.761 | 1.40 | 1.77250 | 49.6 |
| 22 | −47.917 | — | | |

*Aspheric surface:
No. 10; $C = 0$, $A4 = 0.30610322 \times 10^{-4}$, $A6 = 0.17308280 \times 10^{-7}$, $A8 = 0.17819470 \times 10^{-8}$, $A10 = 0$, $A12 = 0$
No. 16; $C = 0$, $A4 = 0.40322927 \times 10^{-4}$, $A6 = 0.14584050 \times 10^{-6}$, $A8 = -0.76957961 \times 10^{-9}$, $A10 = 0$, $A12 = 0$

EXAMPLE 5

$F_{NO} = 1{:}4.0 \sim 6.1 \sim 8.2$   $\omega = 36.7° \sim 22.9° \sim 15.3°$
$f = 28.90 \sim 50.09 \sim 78.07$   $f_B = 8.51 \sim 26.02 \sim 47.86$

| No. | r | d | N | v |
|---|---|---|---|---|
| 1 | −67.000 | 1.50 | 1.83400 | 37.2 |
| 2 | 30.001 | 0.68 | | |
| 3 | 30.169 | 5.94 | 1.69680 | 55.5 |
| 4 | −43.983 | 0.10 | | |
| 5 | 77.305 | 2.27 | 1.69680 | 55.5 |
| 6 | −931.231 | 3.10 ∼ 7.58 ∼ 11.52 | | |
| 7 | −22.586 | 1.20 | 1.83481 | 42.7 |
| 8 | 10.127 | 4.08 | 1.80518 | 25.4 |
| 9 | 231.014 | 1.87 | | |
| 10 | *−34.701 | 1.40 | 1.49176 | 57.4 |
| 11 | −28.642 | 0.58 | plastic | |
| 12 | 16.699 | 6.70 | 1.48749 | 70.2 |
| 13 | −10.395 | 1.80 | 1.80518 | 25.4 |
| 14 | −26.607 | 0.09 | | |
| 15 | 1036.687 | 2.40 | 1.58913 | 61.2 |
| 16 | *−16.961 | 9.90 ∼ 4.90 ∼ 2.27 | | |
| 17 | 207.307 | 3.10 | 1.80518 | 25.4 |
| 18 | −22.394 | 0.48 | | |
| 19 | −38.014 | 1.30 | 1.83400 | 37.2 |
| 20 | 44.888 | 4.50 | | |
| 21 | −10.310 | 1.40 | 1.77250 | 49.6 |
| 22 | −49.443 | — | | |

*Aspheric surface:
No. 10; $C = 0$, $A4 = -0.30610322 \times 10^{-4}$, $A6 = 0.17308280 \times 10^{-7}$, $A8 = 0.17819470 \times 10^{-8}$, $A10 = 0$, $A12 = 0$
No. 16; $C = 0$, $A4 = 0.40322927 \times 10^{-4}$, $A6 = 0.14584050 \times 10^{-6}$, $A8 = 0.76957961 \times 10^{-9}$, $A10 = 0$, $A12 = 0$ The following table shows values that satisfy the conditions (A)-(G) in Examples 1-5.

| Condition | Ex. 1 | Ex. 2 | Ex. 3 | Ex. 4 | Ex. 5 |
|---|---|---|---|---|---|
| (A) | 0.103 | 0.138 | 0.095 | 0.114 | 0.093 |
| (B) | −1.00 | −1.66 | −1.92 | −1.07 | −0.99 |
| (C) | — | −4.9 | −6.0 | −6.0 | −5.9 |
| (D) | −11.9 | −11.3 | −14.3 | −13.6 | −1.11 |
| (E) | 1.083 | 1.071 | 1.088 | 1.123 | 1.096 |
| (F) | 1.036 | 0.679 | 0.629 | 0.799 | 0.896 |
| (G) | 0.28 | 0.37 | 0.26 | 0.31 | 0.25 |

As described on the foregoing pages, the zoom lens system of the present invention is capable of effective compensation for the curvature of field and distortion and it yet satisfies the requirement for a wider angle and a higher zoom ratio at the same time. Further, this lens system permits the use of a smaller-diameter front lens.

As another advantage, the zoom lens system of the present invention intentionally uses a plastic lens which is highly susceptible to temperature changes so as to compensate for and cancel a focus movement that should occur due to other factors.

What is claimed is:

1. A zoom lens system for use with a compact camera having a wide angle of coverage, which zoom lens system comprises, in order from the object side, a first lens unit having a positive focal length, a second lens unit having a positive focal length and a third lens unit having a negative focal length, wherein, when zooming is carried out from a wide-angle end to a narrow-angle end, the first, second and third lens units are all moved towards the object in such a manner that a distance between the first and second lens units increases whereas a distance between the second and third lens units decreases, said zoom lens system being characterized in that the second lens unit comprises, in order from the object side, a sub-unit 2a having a negative focal length, a sub-unit 2b having a positive focal length, and a lens 2m having a positive focal length that is provided between sub-units 2a and 2b and that has a convex surface directed towards the image plane, and said lens 2m satisfying the following conditions:

$$0.0 < \frac{f_s}{f_{2m}} < 0.3 \quad (1)$$

$$-3.0 < \frac{r_{2m}}{f_s} < -0.8 \quad (2)$$

where $f_s$ is the focal length of the overall zoom lens system at the wide-angle end, $f_{2m}$ is the focal length of lens $2m$, and $r_{2m}$ is the radius of curvature of lens $2m$ on its image plane side.

2. A zoom lens system according to claim 1, wherein a stop diaphragm is provided and moved in unison with the second lens unit.

3. A zoom lens system according to claim 1, wherein said lens $2m$ is a plastic lens.

4. A zoom lens system according to claim 3, wherein said plastic lens $2m$ has an aspheric surface that is divergent with respect to a paraxial radius of curvature in such a way that the following condition is satisfied:

$$-15 < \Delta I_{2m} < 0$$

where $\Delta I_{2m}$ is the amount of variation in the coefficient of the third-order spherical aberration due to the aspheric surface of the positive plastic lens $2m$ in the second lens unit, with the aberration coefficient being obtained when the focal length of the overall system at the wide-angle end is regarded as unity.

5. A zoom lens system according to claim 1, wherein said sub-unit $2b$ has an aspheric surface that is divergent with respect to the paraxial radius of curvature in such a way that the following condition is satisfied:

$$-30 < \Delta I_{2b} < -3$$

where $\Delta I_{2b}$ is the amount of variation in the coefficient of the third-order spherical aberration due to the aspheric surface in sub-unit $2b$.

6. A zoom lens system according to claim 1, wherein the first lens unit having a positive focal length comprises, in order from the object side, a biconcave negative lens, a biconvex positive lens and a positive lens having a convex surface directed towards the object.

7. A zoom lens system according to claim 1, wherein the sub-unit $2a$ having a negative focal length comprises a cemented negative lens consisting of, in order from the object side, a biconcave negative lens element and a positive lens element with a cemented interface between them, with the cemented interface being convex towards the object.

8. A zoom lens system according to claim 1, wherein the sub-unit $2b$ having a positive focal length comprises, in order from the object side, a cemented positive lens and a positive lens, said cemented positive lens consisting of, in order from the object side, a positive lens element and a negative meniscus lens element with a cemented interface between them, with the cemented interface being concave towards the object.

9. A zoom lens system according to claim 1, wherein the third lens unit having a negative focal length comprises, in order from the object side, a positive lens having a convex surface directed towards the image plane and two negative lenses each having a concave surface directed towards the object.

10. A zoom lens system according to claim 1, wherein the first lens unit satisfies the following conditions:

$$1.07 < \frac{h_{IMAX}}{h_{I-1}} < 1.4$$

$$0.5 < \frac{f_T}{F_I} < 1.5$$

where $h_{IMAX}$ is the maximum value of the height of paraxial rays in the first lens unit, $h_{I-1}$ is the height of paraxial on-axis rays on the first surface of the first lens unit, $f_T$ is the focal length of the overall system at the narrow-angle end, and $f_I$ is the focal length of the first lens unit.

* * * * *